(12) United States Patent
Salimi et al.

(10) Patent No.: US 11,884,027 B2
(45) Date of Patent: Jan. 30, 2024

(54) WIND TURBINE BLADE MOLD WITH BUILT-IN HIGH PRECISION GEOMETRIC REFERENCES ON B-SURFACE

(71) Applicant: TPI Composites, Inc., Warren, RI (US)

(72) Inventors: Amir Salimi, Providence, RI (US);
Christopher Raine, Cranston, RI (US)

(73) Assignee: TPI COMPOSITES, INC., Warren, RI (US)

( * ) Notice: Subject to any disclaimer, the term of this patent is extended or adjusted under 35 U.S.C. 154(b) by 178 days.

(21) Appl. No.: 17/590,451

(22) Filed: Feb. 1, 2022

(65) Prior Publication Data

US 2022/0242063 A1   Aug. 4, 2022

Related U.S. Application Data

(60) Provisional application No. 63/144,177, filed on Feb. 1, 2021.

(51) Int. Cl.
| | | |
|---|---|---|
| *B29C 70/34* | (2006.01) | |
| *B29C 70/54* | (2006.01) | |
| *B29L 31/08* | (2006.01) | |

(52) U.S. Cl.
CPC ............ *B29C 70/342* (2013.01); *B29C 70/54* (2013.01); *B29C 70/541* (2013.01); *B29C 70/543* (2013.01); *B29L 2031/085* (2013.01)

(58) Field of Classification Search
None
See application file for complete search history.

(56) References Cited

U.S. PATENT DOCUMENTS

| | | |
|---|---|---|
| 2011/0142679 A1 | 6/2011 | Bendel et al. |
| 2012/0091627 A1 | 4/2012 | Schibsbye |
| 2015/0251362 A1 | 9/2015 | Kirkeby |
| 2015/0314537 A1 | 11/2015 | Dahl et al. |
| 2020/0384708 A1 | 12/2020 | Salimi et al. |

OTHER PUBLICATIONS

International Search Report and Written Opinion for International Application No. PCT/US2022/014700 dated May 6, 2022.

*Primary Examiner* — Barbara J Musser
(74) *Attorney, Agent, or Firm* — Stephen J. Kenny; Vincenzo DiMonaco; Foley Hoag LLP

(57) ABSTRACT

Provided herein is a wind turbine blade mold system having built in precision pins to locate structural components (e.g. spar caps) during layup of composite segments. A plurality of pins can be inserted into apertures within the mold, with discs attached to the pins to maintain fixed relative distance to spar caps positioned relative to the pins to ensure precise positioning, thereby preventing/inhibiting movement of the spar cap relative to the mold. The pins can include a first extension that pierce through the layers of composite layups, and protrude above the B-surface of the blade skin. Additionally, the pins can include a marker tip releasably attached to the pin top to provide visual identification of the pin and underlying structural components. The pins can remain embedded within the final molded part.

20 Claims, 17 Drawing Sheets

WIND TURBINE BLADE MOLD WITH BUILT-IN HIGH PRECISION GEOMETRIC REFERENCES ON B-SURFACE

CROSS-REFERENCE TO RELATED APPLICATIONS

This application claims the benefit of priority under 35 U.S.C. § 119(e) of U.S. Provisional Application No. 63/144,177 filed Feb. 1, 2021, the entire contents of which are hereby incorporated by reference.

BACKGROUND OF THE DISCLOSED SUBJECT MATTER

Field of the Disclosed Subject Matter

The disclosed subject matter relates to a system, and corresponding method, of manufacturing large scale composite structures, e.g. wind turbine blades. These large scale composite structures are typically formed from a two-piece mold which, once the blade halves are molded, require a complex component location/installation, and subsequent mold closure process, to complete fabrication. Reduced margins in design of the new generation of wind turbine blades necessitates the development of methods that not only enable the high precision positioning of components, such as shear webs, on the internal or "B-surface" of blade skins but also make the most accurate measurement possible.

In conventional approaches, external fixtures (i.e. gantries) as well as overhead laser projection system are used to assist with component placement. While these methods offer their own advantages and disadvantages, they all lack the high level of accuracy needed to place the components in the strictly specified locations. The current disclosure provides a novel method that not only ensures the proper positioning of components on the B-surface of the skins during molding process but also enables the accurate measurement of the locations.

Particularly, the present disclosure provides structural elements, e.g. elongated pins, having various features which facilitate placement and assembly of other components, e.g., spar caps, and can extend above the upper (internal) B-surface to serve as reference points for accurate measurement. In some embodiments the present disclosure provides positioning elements, e.g. elongated pins and detachable studs. As any minor violation of positioning tolerances for spar caps not only compromises the structural integrity of the blade due to lowering the bending stiffness, but also exceeds the tolerance of bond gaps due to shifts in the core material. The present disclosure provides precise positioning of internal components, e.g. spar caps, within the blade mold throughout the layup process.

DESCRIPTION OF RELATED ART

Wind turbine blades generally comprise a hollow blade shell made primarily of composite materials, such as glass-fiber reinforced plastic. The blade shell is typically made up of two half shells, a lower pressure-side shell and an upper suction-side shell, which are molded separately in respective female half molds, before being bonded together along flanges at the leading and trailing edges of the blade. An exemplary view of a mold half for a wind turbine blade is illustrated schematically in FIG. 1A-C.

Referring to FIG. 1a, this shows a mold 10 for a wind turbine blade divided into two half molds, an upper suction-side mold 10a and a lower pressure-side mold 10b, which are arranged side by side in an open configuration of the mold. A pressure side blade shell 12a is supported on a mold surface 14a of the lower mold 10a and a suction side blade shell 12b is supported on a mold surface 14b of the upper mold 10b. The shells 12a, 12b are each made up of a plurality of glass-fiber fabric layers, which are bonded together by cured resin.

After forming the shells 12a, 12b in the respective mold halves 10a, 10b, shear webs 16 are bonded to spar caps positioned on or within an inner surface 17 of the windward blade shell 12a. The shear webs 16 are longitudinally-extending structures that bridge the two half shells 12a, 12b of the blade and serve to transfer shear loads from the blade to the wind turbine hub in use. In the particular embodiment shown in cross-section in FIG. 1a, the shear webs 16 each comprise a web 18 having a lower edge 19 comprising, optionally, a first longitudinally-extending mounting flange 20 and an upper edge 21 comprising, optionally, a second longitudinally-extending mounting flange 22. Adhesive such as epoxy is applied along these mounting flanges 22 in order to bond the shear webs 16 to the respective spar caps of each half shell 12a, 12b. In some embodiments, the mounting flange can be a discrete component mounted on an interior B-surface of the blade skin; in other embodiments, the mounting flange can be integrally formed with the B-surface of the blade skin.

As shown in FIG. 1b, once the shear webs 16 have been bonded to the upper blade shell 12a, adhesive is applied along the second (upper) mounting flanges 22 of the shear webs 16, and along the leading edge 24 and trailing edge 26 of the blade shells 12a, 12b. The upper mold 10b, including the upper blade shell 12b, is then lifted, turned and placed on top of the lower blade mold 10a in order to bond the two blade half shells 12a, 12b together along the leading and trailing edges 24, 26 and to bond the shear webs 16 to spar caps along an inner surface 28 of the upper blade shell 12b. The step of placing one mold half on top of the other is referred to as closing the mold.

Referring now to FIG. 1C, a problem can arise when the mold 10 is closed whereby the shear webs 16 may move slightly relative to the upper shell 12b. For example, the shear webs 16 may move slightly under their own weight during mold closing or they may be dislodged by contact with the upper shell 12b. Additionally or alternatively, the shear webs and spar caps can be inaccurately placed within the open mold halves prior to closing, resulting in a compromised or defective blade build. Furthermore, the concave curvature of the upper shell 12b also has a tendency to force the shear webs 16 together slightly, as shown in FIG. 1C. Such movement of the shear webs 16 during mold closing may result in the shear webs 16 being bonded to the spar caps and/or upper shell 12b at a sub-optimal position.

As blades are ever increasing in size in order to improve the operational efficiency of wind turbines, safety margins decrease thus requiring manufacturing acceptance criteria and tolerances to become stricter. This necessitates the design and implementation of manufacturing tools that enable high precision process checks to satisfy strict specifications and requirements.

There thus remains a need for an efficient and economic method and system for providing high precision placement and bonding of the internal components, e.g. spar caps, during the assembly phase of wind turbine devices that ensure proper placement of the components, without impacting the structure of the product.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a wind turbine blade mold system comprising: a first mold surface, with at least one aperture located therein; at least one stud having a first end and a second end defining a length therebetween, the second end of the stud disposed within the at least one aperture; at least one pin having a first end and a second end defining a length therebetween, with the second end of the pin releasably connected to the first end of the at least one stud; at least one disc, the at least one disc disposed on the at least one pin, wherein a portion of the disc is configured to engage a structural component of a wind turbine blade; a plurality of layup segments of fiber material disposed above the at least one stud; a pin extension releasably coupled to the first end of the pin; wherein the pin extension is disposed above an uppermost surface of the layup segments.

In some embodiments, a lateral edge of the disc engages the structural component, and the disc is disposed proximate a midpoint of the pin length.

In some embodiments, the first end of the stud extends beyond the first surface of the mold. In some embodiments, the structural component of a wind turbine blade is a spar cap.

In some embodiments, the system further comprises a plurality of apertures asymmetrically disposed about a spanwise central axis of the blade mold; and/or a plurality of apertures disposed along the length of the blade mold.

In some embodiments, the releasable pin extension includes a tapered profile to facilitate piercing of the layup segments. In some embodiments, the releasable pin extension includes a rounded profile to prevent piercing of a vacuum bag disposed above the releasable pin extension. In some embodiments, the releasable pin extension includes a fixture structure having a C-shaped clamp.

In accordance with another aspect of the disclosure, a method of forming a wind turbine blade is provided comprising: providing a first mold surface, with at least one aperture located therein; providing at least one stud having a first end and a second end defining a length therebetween, the second end of the stud disposed within the at least one aperture; providing at least one pin having a first end and a second end defining a length therebetween, with the second end of the pin releasably connected to the first end of the at least one stud; releasably coupling a pin extension to the first end of the pin; depositing a plurality of layup segments of fiber material above the at least one stud, with at least the pin extension passing through each layup segment; inserting a structural component of a wind turbine blade at a location determined relative to the location of the at least one pin; and attaching a disc to the at least one pin, wherein a portion of the disc is configured to engage a structural component of a wind turbine blade.

In some embodiments, a lateral edge of the disc engages the structural component, and the disc is disposed proximate a midpoint of the pin length.

In some embodiments, the method further comprises depositing a second set of layup segments over the structural component and the disc.

In some embodiments, the structural component of a wind turbine blade is a spar cap.

In some embodiments, the releasable pin extension includes a tapered profile to facilitate piercing of the layup segments.

In some embodiments, the method further comprises replacing a first releasable pin extension having a tapered profile with a second releasable pin having a rounded profile; placing a vacuum bag over the second replaceable pin extension; and/or replacing the second releasable pin extension with a third releasable pin extension having a C-shaped clamp.

In some embodiments, forming the first set of layup segments, at least one pin, at least one disc, at least one structural component and a second set of layup segments as an integrally formed product.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE SEVERAL VIEWS OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION

Figure 1A:
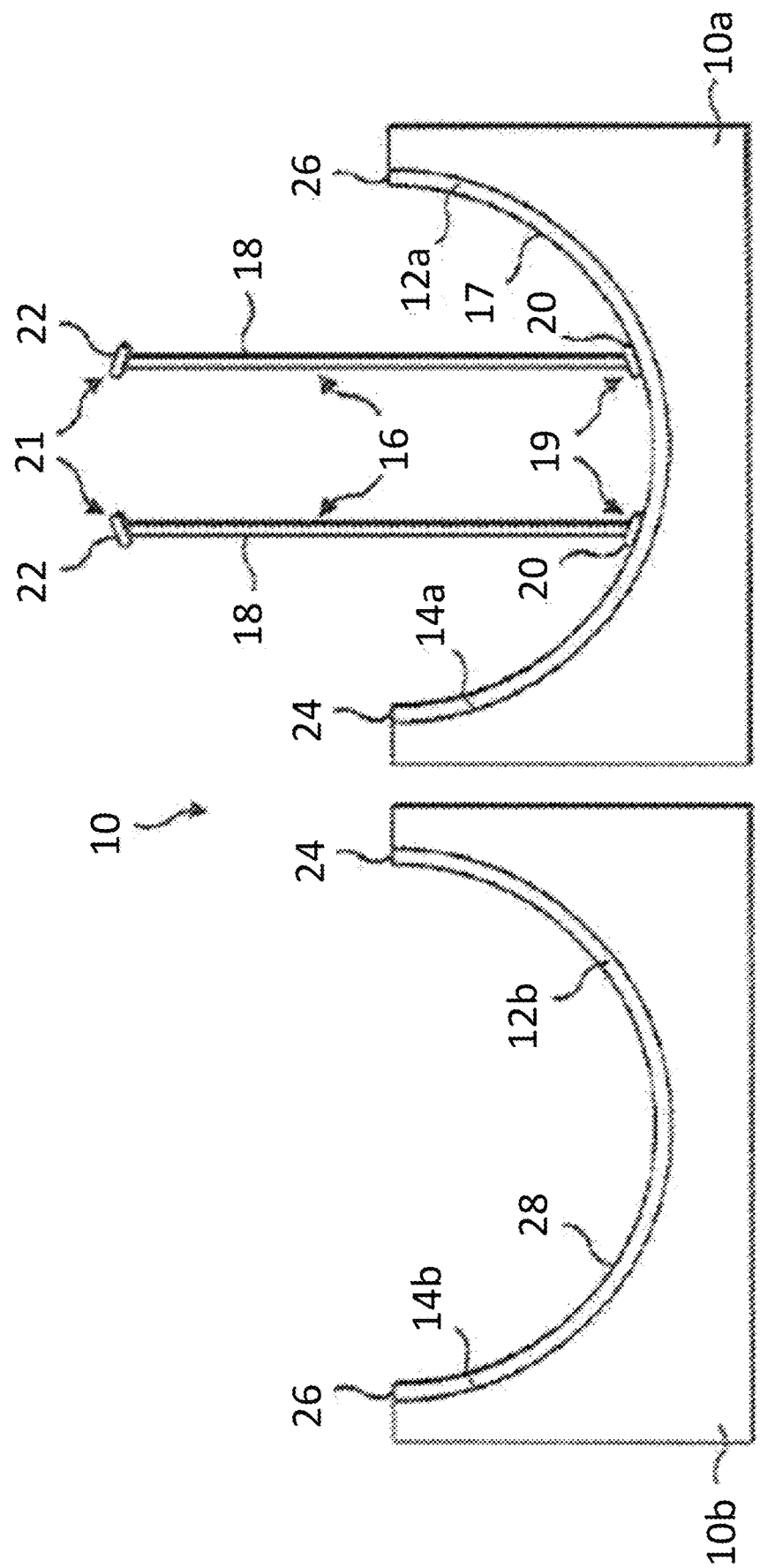
FIGS. 1A-C depict cross-sectional views of a conventional wind turbine blade mold and manufacturing method.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for large structure construction. The disclosed subject matter is particularly suited for construction of wind turbine blades. For purpose of explanation and illustration, and not limitation, an exemplary embodiment of the system in accordance with the disclosed subject matter is shown in the attached figures. Similar reference numerals (differentiated by the leading numeral) may be provided among the various views and Figures presented herein to denote functionally corresponding, but not necessarily identical structures.

Modern wind turbine rotor blades are built from fiber-reinforced plastics as fiber-reinforced plastics have high strength-to-weight ratios. A rotor blade typically includes an airfoil shape having a rounded leading edge and a sharp trailing edge and the blade includes a blade root that connects to a hub of the turbine. Multiple rotor blades are connected at the respective blade root to the hub to create the wind turbine. The blade root includes a plurality of root bushings set within the fiber-reinforced polymer that provides reinforcement to the blade. Bolts are engaged with threads in the root bushings to connect the blade root to the hub.

Figure 1B:
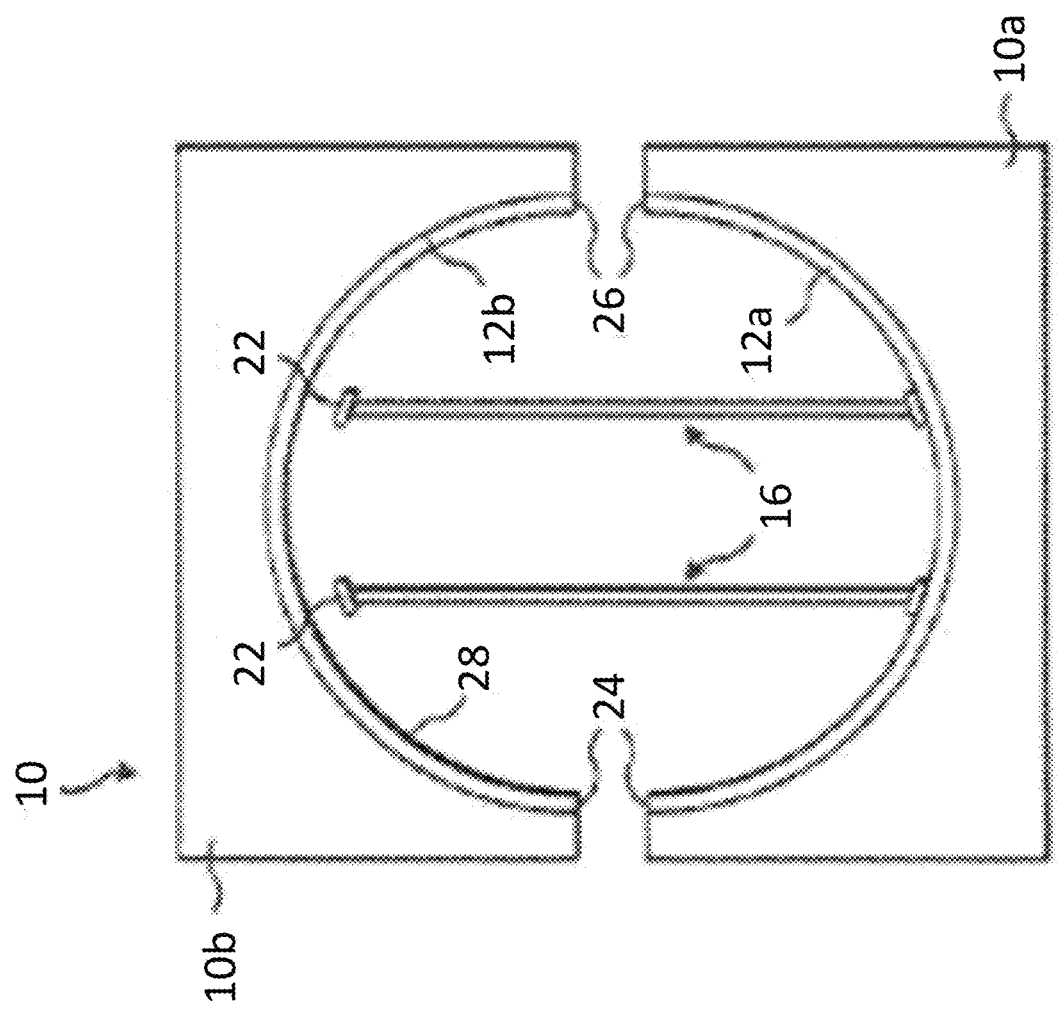
Figure 1C:
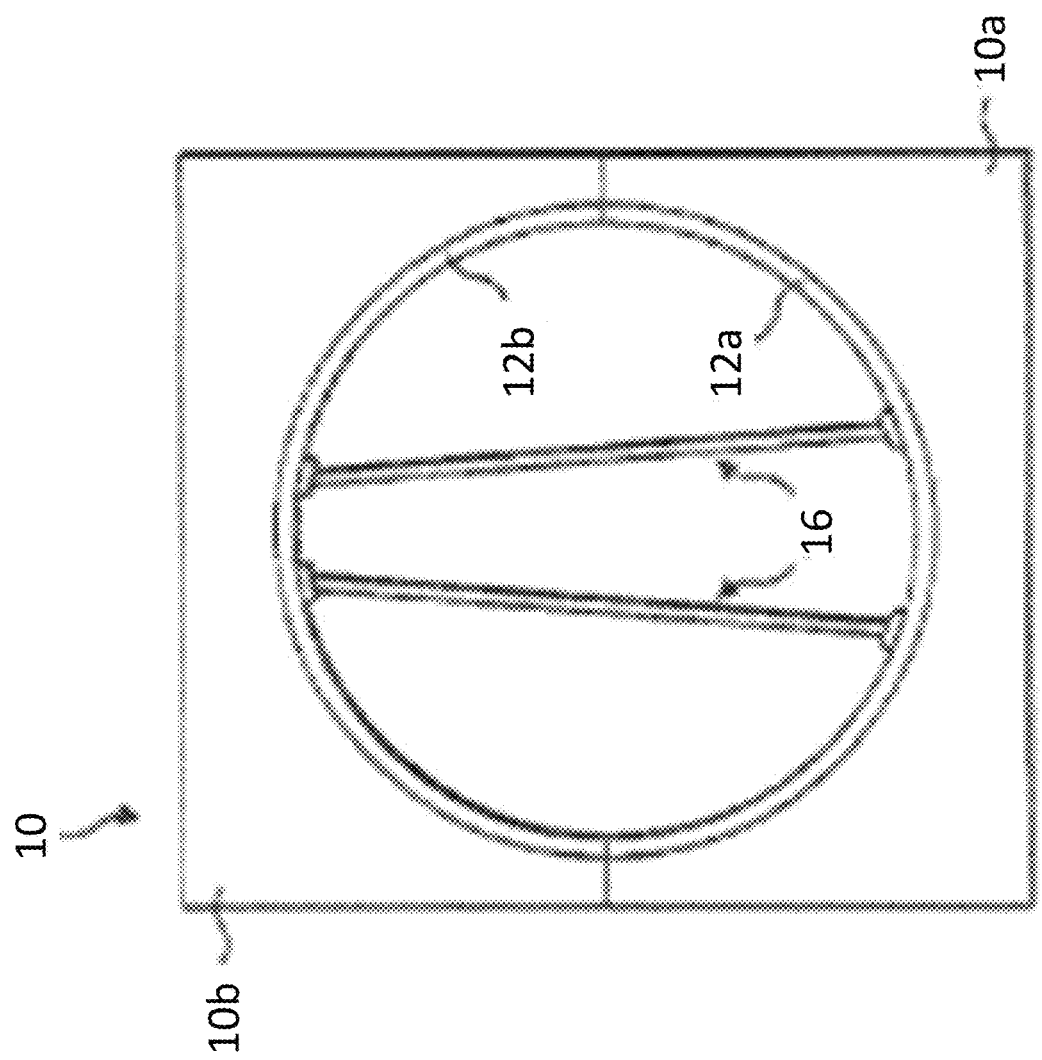

A typical turbine blade is made by molding two half-shells in a pair of molds. A spar cap (analogous to the spar in an aircraft wing), web stiffeners (ribs) and other details may be optionally installed into one of the blade halves. Adhesive is applied to the bonding perimeter/edges of the first shell, for example, in equally-spaced beads. The second half shell is then turned over, still in its mold tool, and lowered onto the first, as shown in FIGS. 1A-C. The molds are pressed together and the adhesive is allowed to cure, joining the two halves of the blade together. This process by which the two blade halves are joined together with paste is called blade closure.

In various embodiments, the blade mold may be made out of any suitable metal as is known in the art. In various embodiments, the mold may include a metal, such as, for example, aluminum, steel, stainless steel, titanium, tantalum, tungsten, or any suitable combination of metals (e.g., a metal alloy). In various embodiments, the mold may include a polymer, for example, polyethylene, polyurethane, polyethylene terephthalate, polyvinyl chloride, etc. In various embodiments, the mold may be made by machining (e.g., CNC machining), 3D printing (e.g., using Direct Metal Laser Sintering (DMLS) and Fused Deposition Modeling (FDM)), open molding, closed molding, resin infusion, compression molding, composite hand layup, injection molding, pultrusion, automated fiber placement, tube rolling, automated tape laying, filament winding, resin transfer molding, or any suitable manufacturing technique as is known in the art. One skilled in the art will recognize that any suitable 3D printing technique may be used to manufacture the components described herein.

The blade shells (i.e. high pressure side and low pressure side, or "inner" and "outer") of the blade are made of a fiber-reinforced polymer, such as fiberglass-reinforced epoxy resin. Other suitable fiber reinforcements may be incorporated together with other fibers or independently, such as, for example, carbon fiber (unidirectional and/or bidirectional), Kevlar, fiberglass (unidirectional and/or bidirectional), etc. Moreover, the blade shells may include any suitable number of layers of fiber reinforcement for the desired thickness and properties of the part. The core, which can be positioned within the "A" and "B" surfaces of the blade skins, is made of any suitable material, such as, for example, a polymer foam (e.g., polyurethane, divinylcell, polyisocyanurate, etc.), a sandwich core (e.g., nomex honeycomb, aluminum honeycomb, balsa, etc.), and/or a polymer honeycomb material.

In forming the composite structure, e.g. wind turbine blade, polymers (which are epoxy based resin systems) are inserted into the mold in a series of panels or "layups". After reaching the designed degree of cure, these polymer layup segments serve as the matrix component in a composite structure to enable the uniform load sharing between reinforcement fibers thereby creating the ultimate mechanical strength in the part. While the cure process could progress in ambient temperature in some cases, in most applications including fabrication of wind turbine blades, external heat sources are employed.

Additionally, a blade may include one or more structural components configured to provide increased stiffness, buckling resistance and/or strength to the blade. For example, the blade may include a pair of longitudinally extending spar caps configured to be engaged against the opposing inner surfaces of the pressure and suction sides of the blade, respectively. Additionally, one or more shear webs may be disposed between the spar caps so as to form a beam-like configuration. The spar caps may generally be designed to control the bending stresses and/or other loads acting on the blade in a generally spanwise direction (a direction parallel to the span of the blade) during operation of a wind turbine. Similarly, the spar caps may also be designed to withstand the spanwise compression occurring during operation of the wind turbine.

The spar caps of the present disclosure can be constructed of a plurality of pultruded members grouped together to form a first portion of the spar caps. In certain embodiments, the pultruded members may be formed by impregnating a plurality of fibers (e.g. glass or carbon fibers) with a resin and curing the impregnated fibers. The fibers may be impregnated with the resin using any suitable means known in the art. Further, the resin may include any suitable resin material, including but not limited to polyester, polyurethane, polybutylene terephthalate (PBT), polyethylene terephthalate (PET), vinyl ester, epoxy, or similar. Further, as shown, the pultruded members separate into one or more pultruded member bundles as the spar cap approaches the blade root so as to form a second portion of the spar cap.

More specifically, the spar cap is constructed of a plurality of pultruded members grouped together to form one or more layers. Thus, the layers may be stacked atop one another and joined together using any suitable means, for example, by vacuum infusing the members together or by bonding the members together via an adhesive, a semi-preg material, a pre-preg material, or similar.

High Precision Placement Pins

The methods and systems described herein facilitate high precision component placement, e.g. spar caps, during molding processes. Particularly, the present disclosure introduces a novel apparatus and method which provides accurate geometric references throughout the blade span, and in some embodiments, can be used as a mechanical stop for components that require a rigid support surface. In some embodiments, the present disclosure can include over-head optical projection and laser tracking systems to assist in locating and measurement tools to place components and reinforcement layers during layup process.

Figure 2:
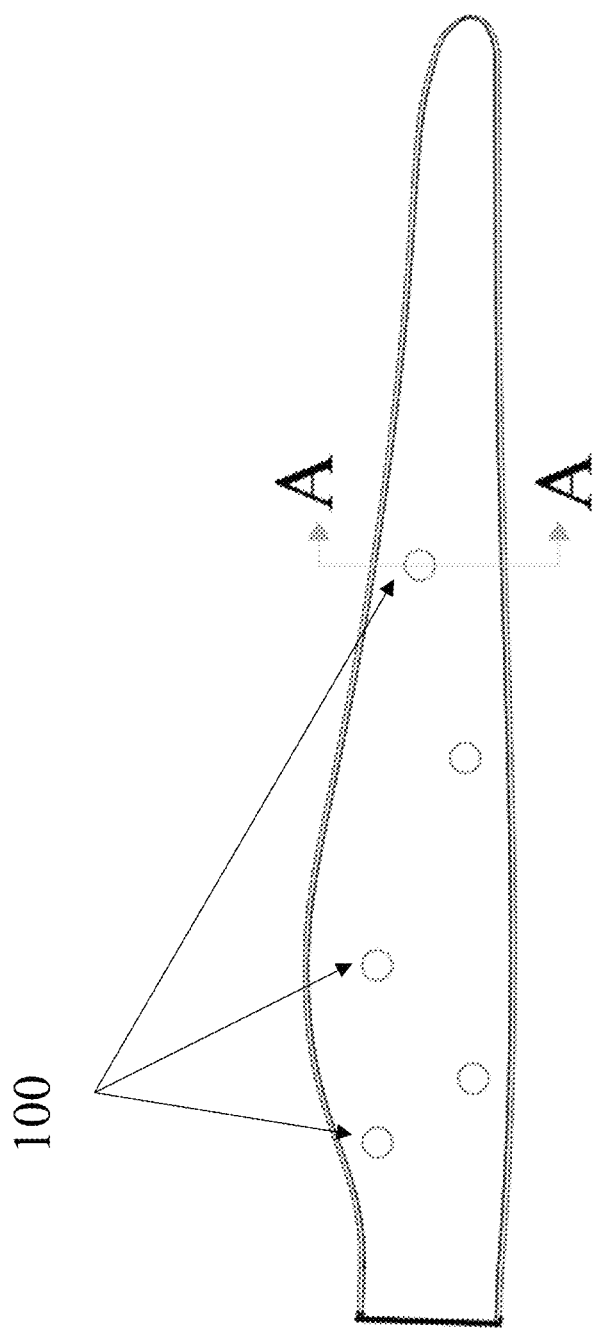
FIG. 2 is a schematic top view of a mold half with exemplary pin locations in accordance with an embodiment of the present disclosure.

FIG. 2 depicts a top view of a blade mold half, with a plurality of apertures (100) distributed along the blade span. The apertures (100) can be a hole (extending completely through the mold surface), recess or indentation (of sufficient depth to receive the locating feature or "pin" as described below) within the mold surface, and will be referred to as "pin holes" throughout for convenience. The location(s) of the pin holes (100) are specified in the 3D manufacturing model of the blade mold. In order to fabricate the mold (which will be employed to fabricate wind turbine blades), a male "plug" is first formed to serve as the structure which imparts the specified geometry into the mold. During plug build, precision pin holes are formed, e.g., CNC machined, into the plug surface. The pin holes (100) are thereafter transferred to the final mold and can serve as reference point(s) to calibrate and verify proper positioning of any overhead laser projection or Faro measurement system. While a plurality of pin holes (100) are permanently formed in the mold, select pin holes can be plugged or occluded if not employed for receiving a pin, as described in more detail below.

The number and location of the pin holes (100) can vary depending on blade design specifications, e.g., number of spar caps, location and size, etc. As shown in FIG. 2, the distribution of pin holes (100) need not be uniform but instead concentrated in select areas of the blade. Also, although the holes (100) are depicted as having a circular shape, alternative geometries (e.g. rectilinear shapes with straight edge(s)) can be employed—along with complimentary shaped pins, as described in further detail below. The number, distribution and geometry of the pin hole(s) can vary along the blade span, e.g., there can be a greater concentration of pin holes (100) at locations with large/heavy internal components and/or more complex geometry or surface contours, e.g., with a greater number of pin holes (100) located proximate the root as compared to the tip of the blade.

Figure 3:
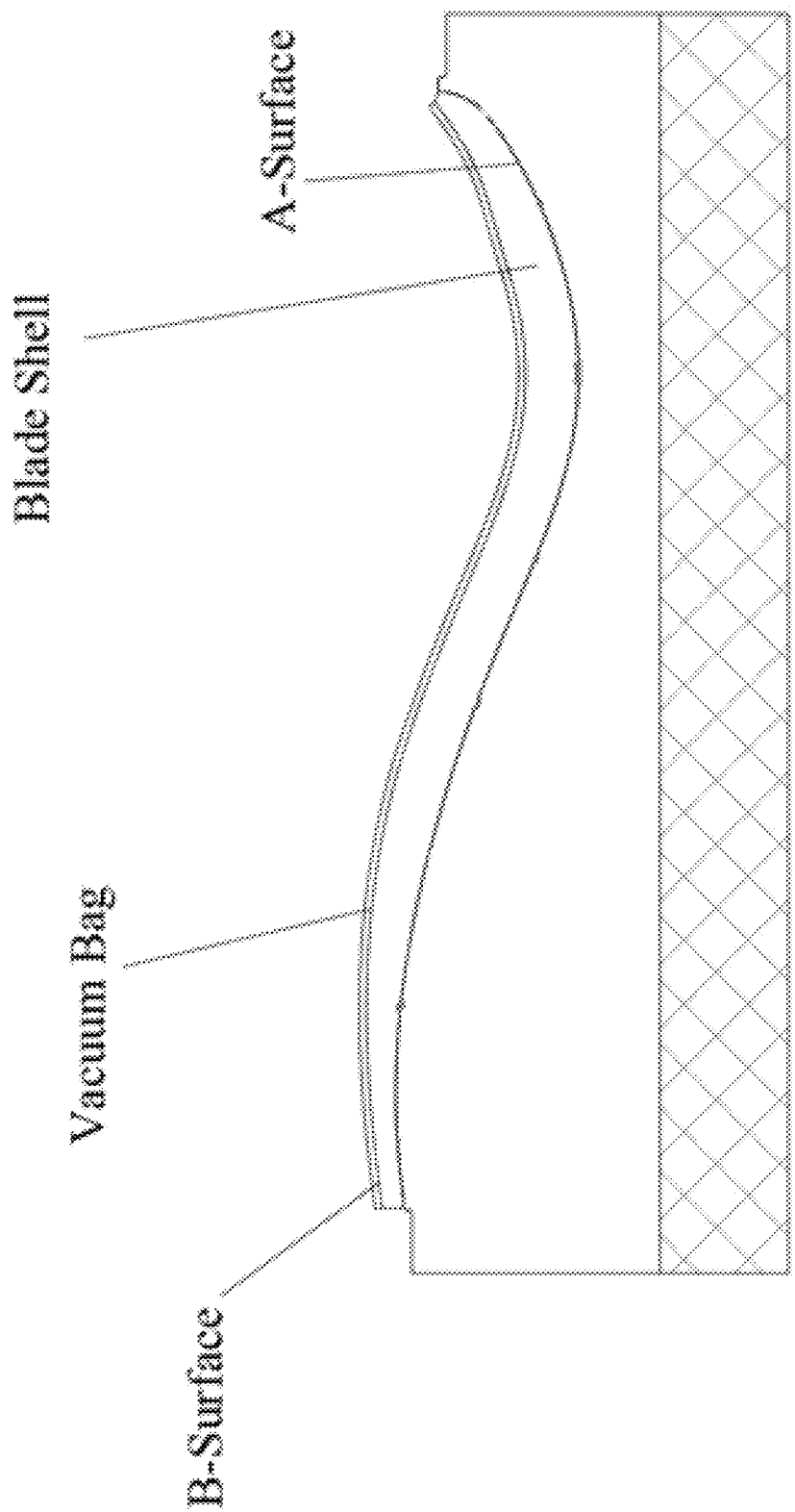
FIG. 3 illustrates a cross-sectional view of a partial (one-sided) wind turbine blade mold depicting an A-surface and B-surface of the blade skin relative to the mold surface in accordance with the disclosed subject matter.
Figure 4:
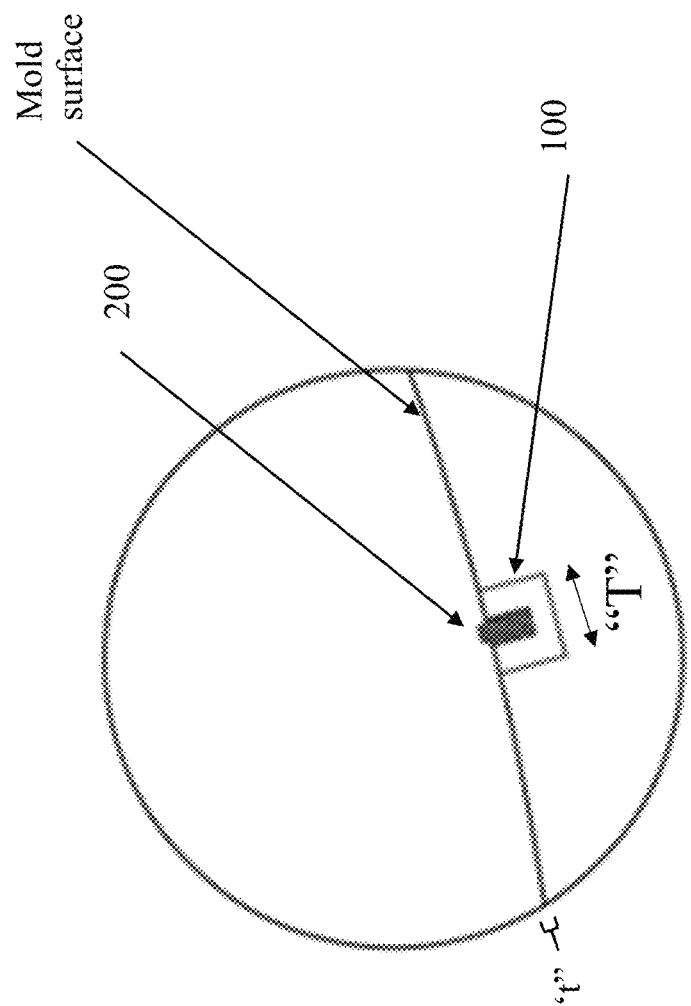
FIGS. 4-15 illustrate exemplary geometric references on the inner (or "B-surface") of a wind turbine blade skin according to embodiments of the present disclosure.

FIG. 3, depicts a cross-sectional view of a blade mold with a blade shell formed thereon, depicting the outer A-surface (i.e. surface that will become exterior surface when the blade is finally formed and installed for use) and the inner B-surface of the blade shell. FIG. 4 depicts a cross sectional view of an exemplary pin hole (100). This exemplary embodiment of pin hole (100) depicts a cylindrical hole, however alternative geometries (e.g. curved, non-linear) are within the scope of the present disclosure. Also, the pin hole (100) can have a reinforced cavity for receiving the pin such that the perimeter of the sidewall defining the pin hole has a thickness "T" which is greater than the thickness "t" of the mold surface proximate the pin hole. This additional thickness provides strength and rigidity in the pin hole (100) for receiving and guiding the pin when inserted therein.

In accordance with another aspect of the disclosure a stud member (200) which can be at least partially inserted within the pin hole (100) prior to blade manufacturing steps (e.g., gel application) to avoid resin ingress into the pin holes. In some embodiments, the studs (200) are sized to extend above the blade mold surface, and can be permanently or releasably secured within the hole (100) (e.g. either via friction fit or via a threaded fastener, tongue and groove, etc.). The studs can further include a removable shroud (e.g. cone or skirt) that extends circumferentially around, and beyond, the diameter of the hole so as to prevent any undesired gel/resin ingress into the hole 100.

Figure 5:
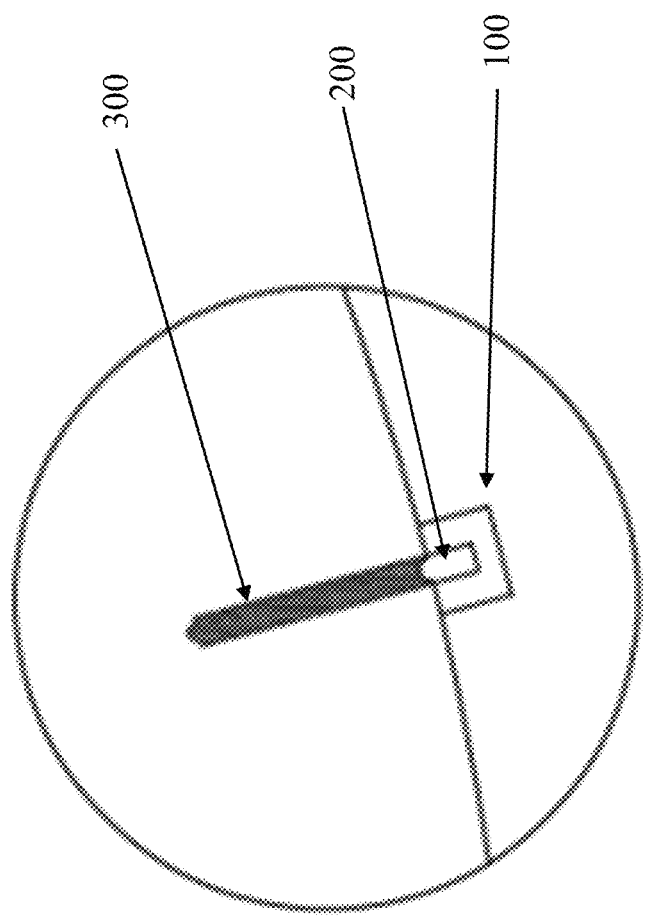

FIG. 5 depicts the insertion of the locating feature (300) which can be a pin, or an elongated member (e.g. elongated wall), though this disclosure will refer to the locating feature as "pin" throughout for convenience (however it is to be understood that alternative, e.g. non-cylindrical, geometries are contemplated to be within the scope of the present disclosure). As shown, the pins (300) are attached to the top end of the studs (200), which are previously inserted into the mold pin holes (100). The pins (300) can be releasably secured to the upper end of the studs (which in the exemplary embodiment shown, project above the mold surface) via mechanical coupling e.g., threaded coupling, friction or "snap" fit between male/female members, tongue and groove, etc. Additionally or alternatively, the pins (300) can be connected to the studs (200) via magnetic or adhesive bonding. The pin (300) can be sized with an outer dimension/diameter that is equivalent to the outer dimension/diameter of the stud (200); alternatively, the pin (300) can have a larger dimension/diameter than the stud (200) such that the stud is at least partially received within the pin (300) when the stud is inserted therein. In some embodiments, the connection between pins (300) and studs (200) is frangible such that during the demold process (i.e. removing the blade from the mold) the pins (300) break or detach from the stud (200) with the pins (300) remaining within the molded blade while the studs (200) remain in the mold (100).

Figure 6:
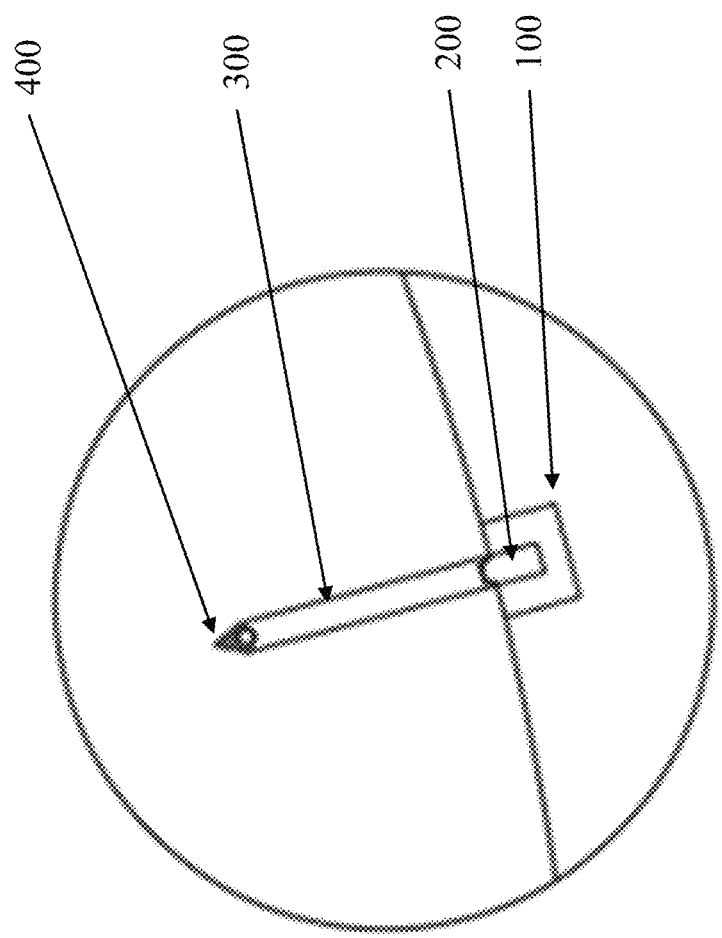

FIG. 6 depicts an extension 400 that can be integrally formed with the pin 300, or alternatively, formed as a separate component that is (removably) attached to the top or distal end of the pin 300. The extension 400 can be formed with a sharpened tip to facilitate piercing of layup segments of fiber that will be placed over the pins in subsequent manufacturing steps. The extension 400 can also include reflective properties (e.g. formed of radiopaque material) to facilitate identification and measurement of the pins throughout the mold. Additionally, each extension 400 can exhibit a distinct spectral profile (e.g. exhibit/reflect a particular wavelength of light) so as to provide a unique identification of each pin in the mold. The extension (400) can be formed of varying sizes and shapes, but in the exemplary embodiment, has a tapered profile with a maximum width equal to the width (or diameter) of the pin 300. In some embodiments, the extension (400) can initially be housed (e.g. telescopingly) within the pin (300) itself, and be dispensed up/out beyond the tip of the pin (300) upon command, e.g. after layup segments are installed.

Figure 7:
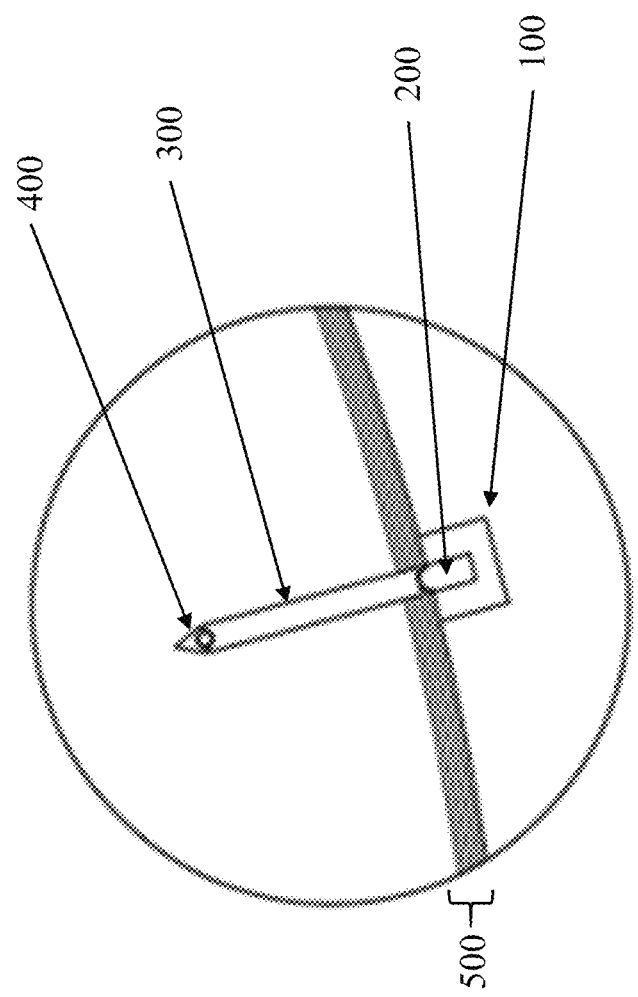

FIG. 7 depicts a plurality of layers of composite fiber panels, or "layups" (500) deposited on top of the pin (300) and stud (200) assembly, which is disposed on top of the pin hole (100). The pins (300), and extension (400) if present, are passed through the layup layers (500) and extend above the top surface of the layup layers, as shown. Upon completion of the layup process, the tips of the pins (300/400) remain visible over the composite glass layers (500). These reference marks of the pin heads (300/400) serve as a visual basis for placement of spar cap. In some embodiments the pins (300) can include graduated markings on its side to denote the height of the stack of layup segments (500) to provide a visual aid to an operator confirming that a predetermined number/height of layup segments has been installed, and/or serve as a basis of comparison of the status of layup segment at a given location of the blade with respect to another (e.g. root vs. tip).

Figure 8:
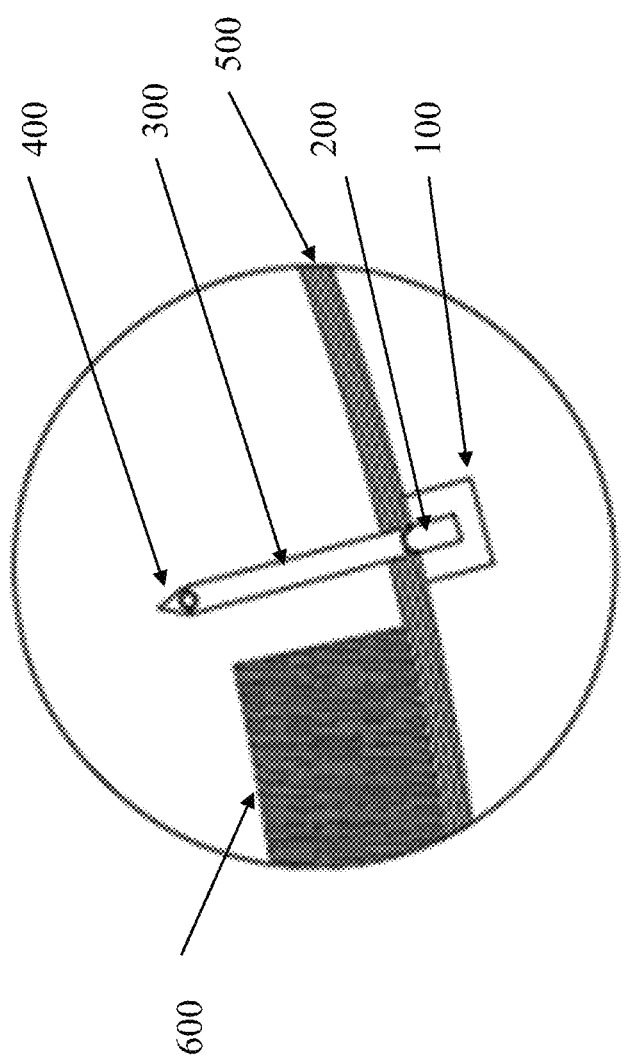

FIG. 8 depicts the addition of an internal structural component (e.g. spar cap) (600) on top of the layup segments (500) and spaced from the pin (300). The internal structural component (e.g. spar cap) (600) placement process employs the placement pins as a point of reference, and in some embodiments as a load bearing member (e.g. the spar cap can be placed in contact with the pin). The structural component (600) can be positioned with respect to the location of the pin (300). For example, the structural component (600) can be positioned within the mold in the space between adjacent pins (300).

Figure 9:
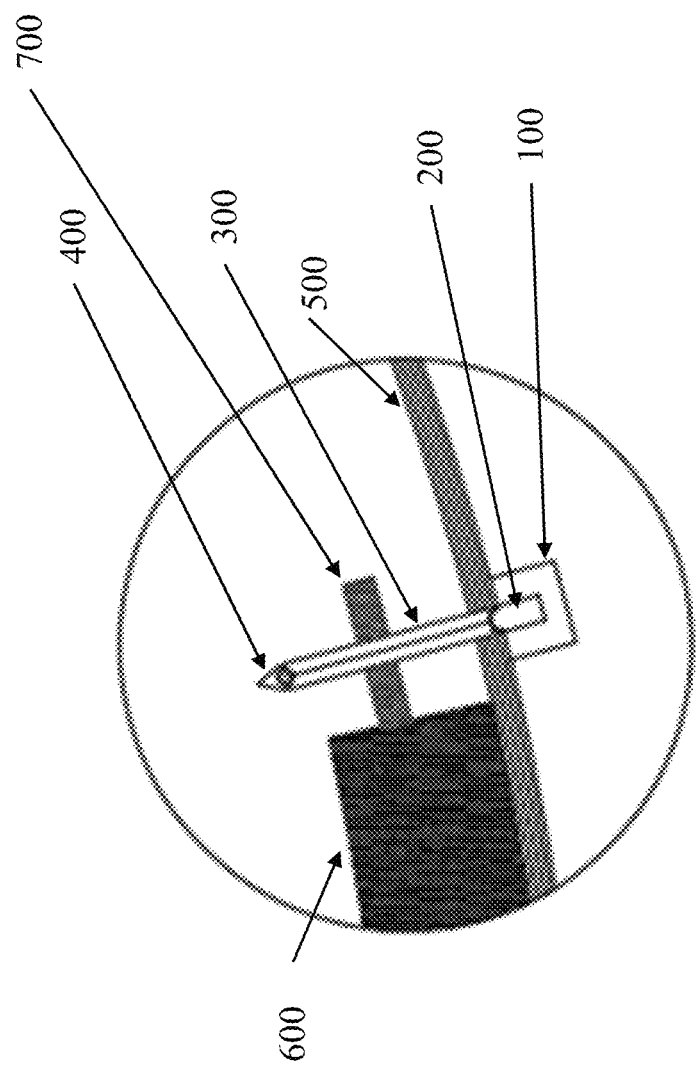

FIG. 9 depicts a top view of the mold after the layers of layup segments (500) have been deposited and the internal structural component (600) is positioned relative to the pins (300), and also includes precision discs (700) attached to the pins (300). In some embodiments, the discs (700) are removably attached to the pins after insertion of the layup segments, but before insertion of the structural component (600). The discs (700) maintain a predetermined and fixed distance between the pins (300) and the internal structural component (600). The discs (700) can be advanced down a preset length of the pin (300) so that they maintain desired height above the mold surface and/or any layup layer(s) (500). Also, the disc can be adjustable, so that an operated can raise/lower the location of the disc (700) relative to the pin (300) as desired to accommodate structures (600) of varying sizes/geometries. In some embodiments, the pin (300) can include a protruding portion (e.g. nubb or shelf) that matingly receives the disc (700) and prohibits any further downward movement of the disc. Additionally or alternatively, the pin (or disc) can include an interlocking feature(s) (e.g. tongue/groove) so that the pin and disc are fixedly, but releasably, coupled together. In some embodiments the discs (700) are circular with a fixed diameter; in some embodiments the discs are asymmetrical such that the space between the pin (300) and adjacent structural component (600) can be greater on one side of the pin than another side of the pin. Also, the discs (700) may extend a uniform distance in all directions from the pin; alternatively, the discs need not be circular and instead can extend different distances from select sections of the pin (300).

Figure 10:
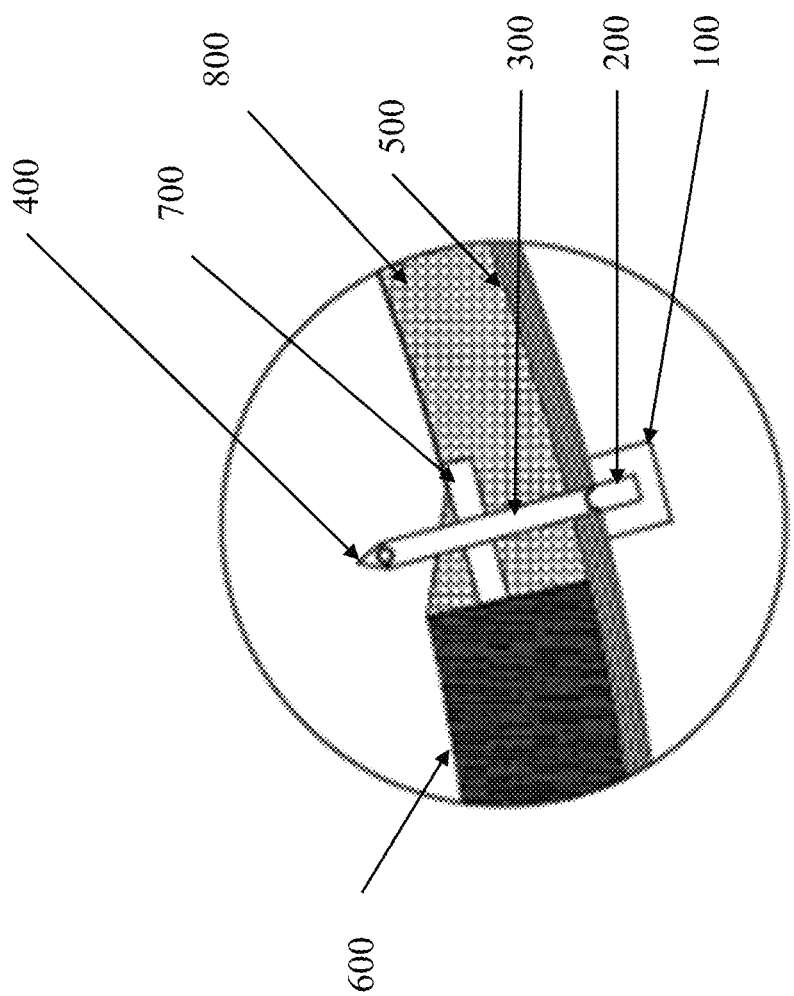

FIG. 10 depicts the addition of a core material (800) (e.g. balsa wood) that is sized in accordance with the distance measured by the disc (700) and matingly engages or abuts the structural component (600) to prevent any movement thereof. As shown, the core material (800) can extend above the disc (700) to reach the same height as the structural component (600). Also, the core material can be positioned on both sides (and/or circumscribing) the pin 300). The extension (400) of the pin extends above and beyond the upper surface of the structural component (600) and the disc (700) so as to remain visible to the technician and/or overhead optical projection (e.g. laser) system, if included. In some embodiments, a portion of the pin (300) can also extend above and beyond the upper surface of the structural component (600) and the disc (700).

Figure 11:
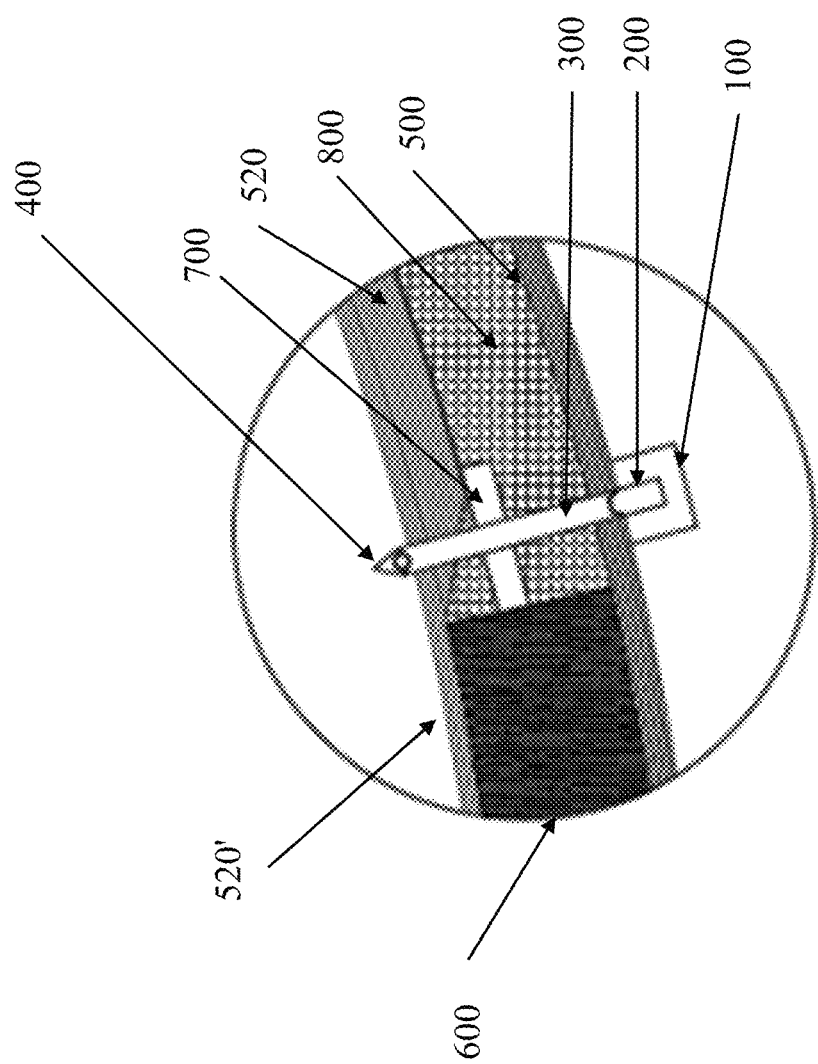

As shown in FIG. 11, once the location of the structural component(s) (600) are verified to be accurately positioned within the blade mold, a second section of additional layup segments (520) can be positioned on top of the structural components (600), pins (300), core material (800), discs (700), and first section of layup segments (500). In the exemplary embodiment shown, a first series of layup segments (520) can be positioned in contact with the core (800) while a second series of layup segments (520') can be positioned in contact with the structural member (600), but not the core (800). As shown, the extension (400) of the pin passes/pierces through each successive layer of fiber layup (520) such that the extension (400) extends above and beyond the upper surface of the additional or upper layer(s) of fiber layups (520).

Figure 12:
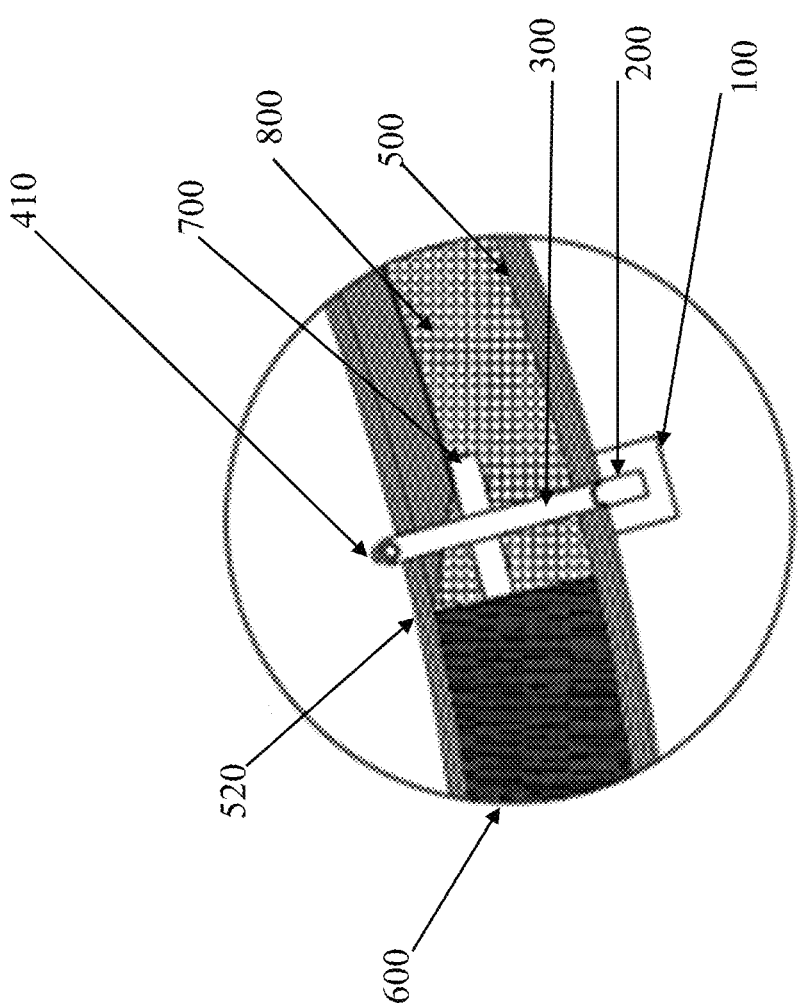

Upon completion of the (second) layup process, the sharpened tip of pin extension (400) protrudes or extends beyond the B-surface (or upper/interior surface) of the completed blade skin. Next, the sharpened tip (400) can be removed from the tip of the pin (300) and replaced with a round/blunt/bulbous extension (410), as shown in FIG. 12, so as to avoid any damage to the vacuum bag which is to be placed on top of the layup segments, core(s), structural elements, pins, and discs. The blunt extension (410) can also exhibit the visual identification properties (e.g. radiopaque or reflective) as described above with respect to the sharpened/piercing extension (400) to precisely identify the location(s) of the underlying structural component(s) (600).

Figure 13:
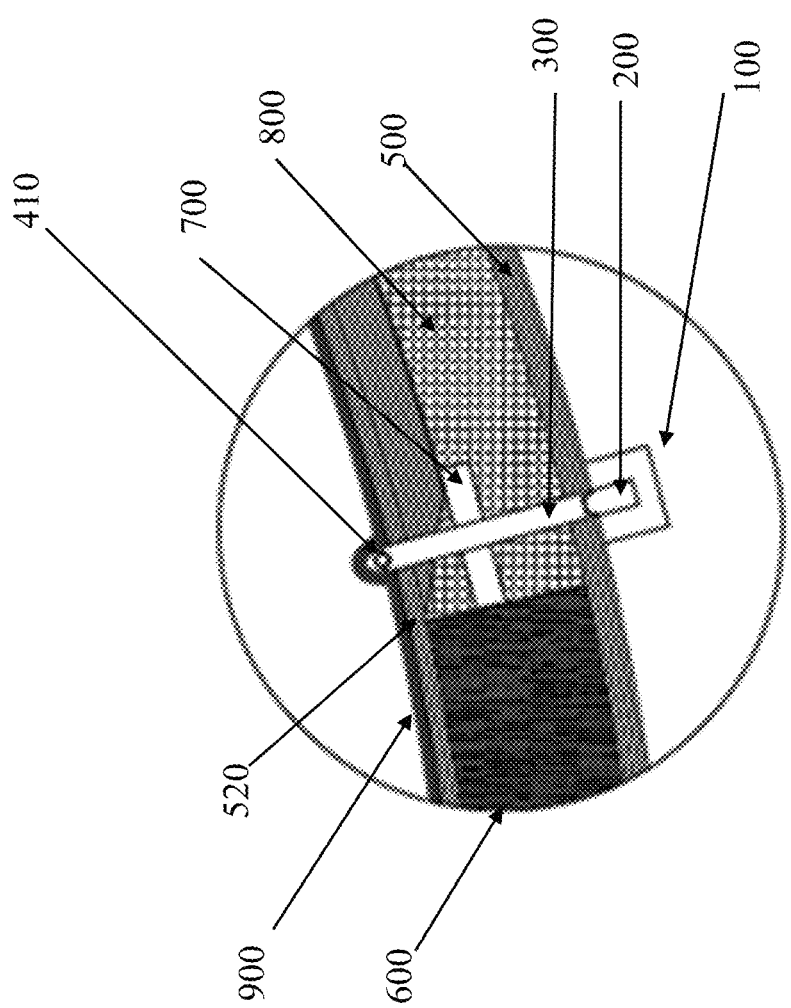

As shown in FIG. 13, a bag (900) can be sealed around the perimeter of the mold to create a vacuum and the resin infusion processes can conducted with the pins (300) included in the infusion area. The fitting tolerance of studs (200) and pin holes (100) prevents the ingress of infusion resin into the pin holes (100). Advantageously, the presence of the pins (300) with the spar caps (600) during these subsequent operations ensures no displacements occur during infusion and cure processes.

As shown, after the resin infusion, and cure, processes are completed the bag (900) is removed and the complete molded part which includes: first section of layup layers (500), pin(s) (300), structural components (600), core material (800) and second section of layup layers (520), and the (blunt) pin extension (410) are removed from the mold (100) by disengaging the pins (300) from the studs (200). The mechanical connection between the pin (300) and stud (200) is configured such that under relative vertical motion, the pin (300) disengages or separates from the stud. Accordingly, the pins (300) remain within the blade and the studs (200) remain within the mold. In some embodiments, a small pin hole (equal to the shape of stud (200) protruding out of the mold) can remain in the outer (i.e. lower as shown in FIG. 13) surface of the layup 500; this can be filled in a subsequent skin treatment process. In this embodiment, the pin(s) (300) permanently form part of the assembled/molded product and remain as hard stops preventing spar cap (600) drift. The studs (200) can be sized so as to extend above the top surface of the mold (100), such that after separating the studs (200) from the pins (300), recesses remain in the molded product at the locations of the studs (200). Thus there remains a way to visually identify the location of internal components (e.g. core 800, spar cap 600) from both A and B sides of the blade. In other words, the blunt pin extension (410) can be detected from the B (or internal) surface, while the pin hole (resulting from the stud protrusion (200)) can be detected from the A (or exterior) surface.

Additionally or alternatively, the studs (200) can be sized so as to not extend above the top surface of the mold (100), with the pins (300) extending beyond the mold surface and into the pin hole (100), resulting in pins (300) which extend beyond the external surface of the molded part (e.g. beyond the bottom surface of the first section of layup layers 500). This portion of the pins (300) that extends beyond the external surface can be trimmed to provide a smooth and continuous external blade surface, resulting in a finished product.

Figure 14:
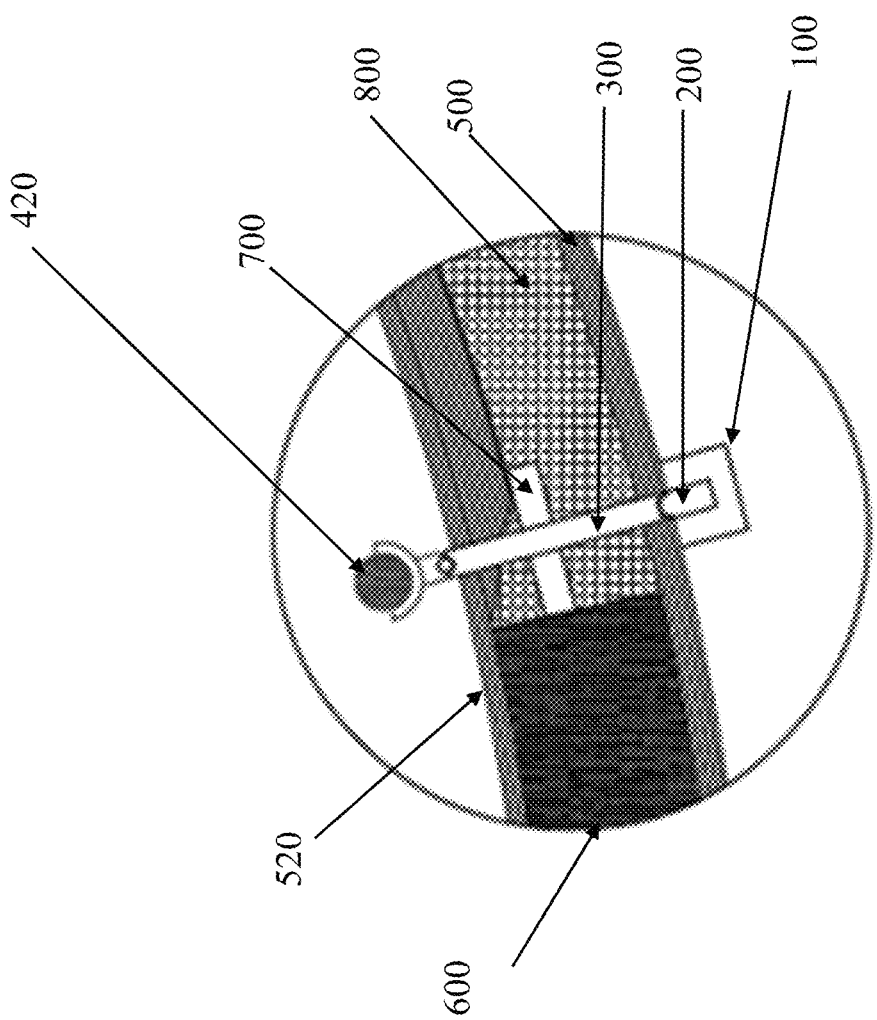

As shown in FIG. 14, after debagging (i.e. removal of the vacuum bag 900 from FIG. 13) the blunt pin extension (410) can be replaced with a marker tip (420) to provide a high precision reference point for use in a laser projection and registration system. That is, the marker tip (420) can be attached to the upper portion of the pin and denote an edge of an (underlying, and covered with layers of fiber layup segments) structural member (600). The marker tip (420) can be moveable/adjustable, e.g. can rotate about the vertical axis of the pin (300) and/or pivot/hinge about an axis perpendicular to the vertical pin axis. This allows for the marker tip (420) to be oriented at an optimal angle with respect to an (overhead, or laterally external to blade) optical projection system.

Figure 15:
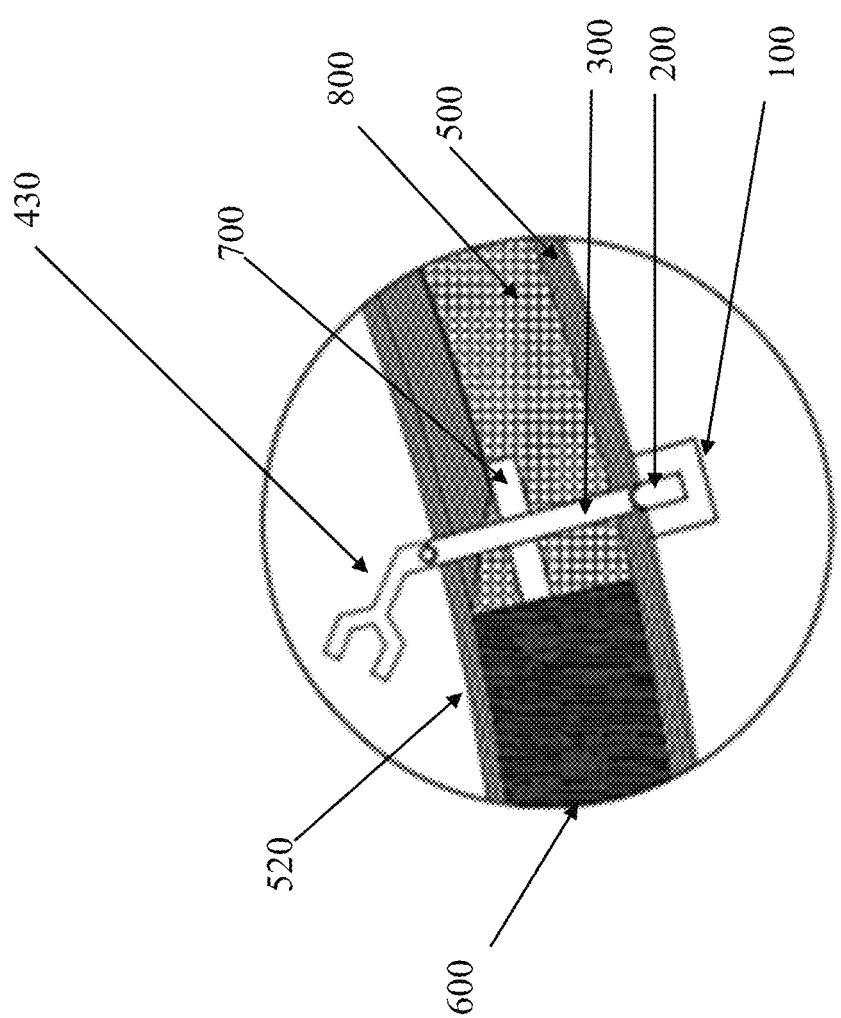

As shown in FIG. 15, the marker tip (420) can further be replaced with a fixture structure (430) that can be mounted on the top of pin (300) such that the fixture structure (430) extends beyond the B-surface of the blade. The fixture structure can be a bracket or C-shaped clamp. Similarly to the marker tip (420), the fixture structure (430) can be moveable/adjustable, e.g. can rotate about the vertical axis of the pin (300) and/or pivot/hinge about an axis perpendicular to the vertical pin axis. This allows for the fixture structure (430) to be oriented at an optimal angle with respect to an (overhead, or laterally external to blade) any other internal component, or machinery (e.g. hoist for moving the blade halves and facilitating the folding to form a complete closed blade).

As referenced above, a variety of pin configurations can be employed within the embodiments disclosed herein. In the exemplary pin embodiment shown in FIG. 6B, the pin can include a first section having a smaller cross-sectional area than the second section which is inserted within, receives, or is attached to the stud (200) within pin hole (100). The change in area can be an abrupt or stepped change or a gradual taper. Additionally or alternatively, the distal end of the stud (200) can be spaced from a bottom of the pin hole (100), or extend to abut the bottom of the pin hole.

Accordingly, the present disclosure provides numerous advantages and improvements over conventional blade structures and manufacturing techniques, including providing a high precision point of reference with respect to internal blade components, rather than external mold frame, thereby the reference features can remain inside the vacuum bagging.

Thus, the high precision pins disclosed herein assist with the placement of layup components, provide support for parts (e.g. spar caps) during infusion and also serve as an accurate reference point on the B-surface of the blade skin. Accordingly, the pins serve to place the components in the correct position, but also allow for measurement of the positions with a high degree of accuracy and confidence.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wind turbine blade mold system comprising:
    a first mold surface, with at least one aperture located therein;
    at least one stud having a first end and a second end defining a length therebetween, the second end of the at least one stud disposed within the at least one aperture;
    at least one pin having a first end and a second end defining a pin length therebetween, with the second end of the at least one pin releasably connected to the first end of the at least one stud;
    at least one disc, the at least one disc disposed on the at least one pin, wherein a portion of the at least one disc is configured to engage a structural component of a wind turbine blade;
    a plurality of layup segments of fiber material disposed above the at least one stud;
    a pin extension releasably coupled to the first end of the at least one pin;
    wherein the pin extension is disposed above an uppermost surface of the layup segments.

2. The system of claim 1, wherein a lateral edge of the at least one disc engages the structural component.

3. The system of claim 1, wherein the at least one disc is disposed proximate a midpoint of the pin length.

4. The system of claim 1, wherein the first end of the at least one stud extends beyond the first mold surface.

5. The system of claim 1, wherein the structural component of the wind turbine blade is a spar cap.

6. The system of claim 1, further comprising a plurality of apertures asymmetrically disposed about a spanwise central axis of the first mold surface.

7. The system of claim 1, further comprising a plurality of apertures disposed along the length of the first mold surface.

8. The system of claim 1, wherein the pin extension includes a tapered profile to facilitate piercing of the layup segments.

9. The system of claim 1, wherein the pin extension includes a rounded profile to prevent piercing of a vacuum bag disposed above the pin extension.

10. The system of claim 1, wherein the pin extension includes a fixture structure having a C-shaped clamp.

11. A method of forming a wind turbine blade comprising:
    providing a first mold surface, with at least one aperture located therein;
    providing at least one stud having a first end and a second end defining a length therebetween, the second end of the at least one stud disposed within the at least one aperture;
    providing at least one pin having a first end and a second end defining a pin length therebetween, with the second end of the at least one pin releasably connected to the first end of the at least one stud;
    releasably coupling a first pin extension to the first end of the at least one pin;
    depositing a plurality of layup segments of fiber material above the at least one stud, with the first pin extension passing through each layup segment;
    inserting a structural component of a wind turbine blade at a location determined relative to the location of the at least one pin;
    attaching at least one disc to the at least one pin, wherein a portion of the at least one disc is configured to engage the structural component of a wind turbine blade.

12. The method of claim 11, wherein a lateral edge of the at least one disc engages the structural component.

13. The method of claim 11, wherein the at least one disc is disposed proximate a midpoint of the pin length.

14. The method of claim 11, further comprising depositing a second set of layup segments over the structural component and the at least one disc.

15. The method of claim 11, wherein the structural component of a wind turbine blade is a spar cap.

16. The method of claim 11, wherein the first pin extension includes a tapered profile to facilitate piercing of the layup segments.

17. The method of claim 16, further comprising replacing the first pin extension having a tapered profile with a second pin extension having a rounded profile.

18. The method of claim 17, further comprising placing a vacuum bag over the second pin extension.

19. The method of claim 18, further comprising replacing the second pin extension with a third pin extension having a C-shaped clamp.

20. The method of claim 11, further comprising forming the plurality of layup segments, the at least one pin, the at least one disc, and the structural component as an integrally formed product.

\* \* \* \* \*